United States Patent [19]
Satou et al.

[11] Patent Number: 5,962,159
[45] Date of Patent: Oct. 5, 1999

[54] BATTERY PACK WHICH CAN BE ATTACHED INDEPENDENT OF ORIENTATION

[75] Inventors: Katsunori Satou; Naohisa Tsukamura, both of Sumoto, Japan

[73] Assignee: Sanyo Electric Co., Ltd., Moriguchi, Japan

[21] Appl. No.: 08/839,863

[22] Filed: Apr. 22, 1997

[30] Foreign Application Priority Data

Apr. 26, 1996 [JP] Japan .................................. 8-107571

[51] Int. Cl.⁶ ........................................................ H01M 6/44
[52] U.S. Cl. .............................. 429/99; 429/1; 429/151; 429/178
[58] Field of Search ........................ 429/1, 7, 99, 100, 429/151, 159, 164, 178, 179, 121, 123, 96, 97

[56] References Cited

U.S. PATENT DOCUMENTS

| | | | |
|---|---|---|---|
| 3,220,888 | 11/1965 | Moore et al. | 136/173 |
| 3,967,979 | 7/1976 | Kaye | 429/99 |
| 5,296,314 | 3/1994 | Millauer et al. | 429/99 |

FOREIGN PATENT DOCUMENTS 2-12157  1/1990  Japan .

*Primary Examiner*—Maria Nuzzolillo
*Assistant Examiner*—Jennifer O'Malley
*Attorney, Agent, or Firm*—Wenderoth, Lind & Ponack, L.L.P.

[57] ABSTRACT

The battery pack which can be attached independent of its orientation houses rechargeable batteries within a case and has positive and negative (+ −) charge-discharge terminals at one end of the case. The charge-discharge terminals are arranged to connect to electrical apparatus without regard to the orientation of the front or back sides of the case. The + − charge-discharge terminals are sheet metal bent in flat-sided c-shapes, and comprise a parallel charge-discharge terminal piece which attaches to the case parallel to the case opening plane and a perpendicular charge-discharge terminal piece which attaches to the case perpendicular to the parallel charge-discharge terminal piece. The parallel charge-discharge terminal piece attaches by fitting into an attachment section formed as a single piece in the case opening. The open sides of the c-shaped parallel charge-discharge terminal piece and perpendicular charge-discharge terminal piece face each other in opposite fore and aft directions, and the two terminal pieces attach to the case in an orthogonal fashion.

16 Claims, 14 Drawing Sheets

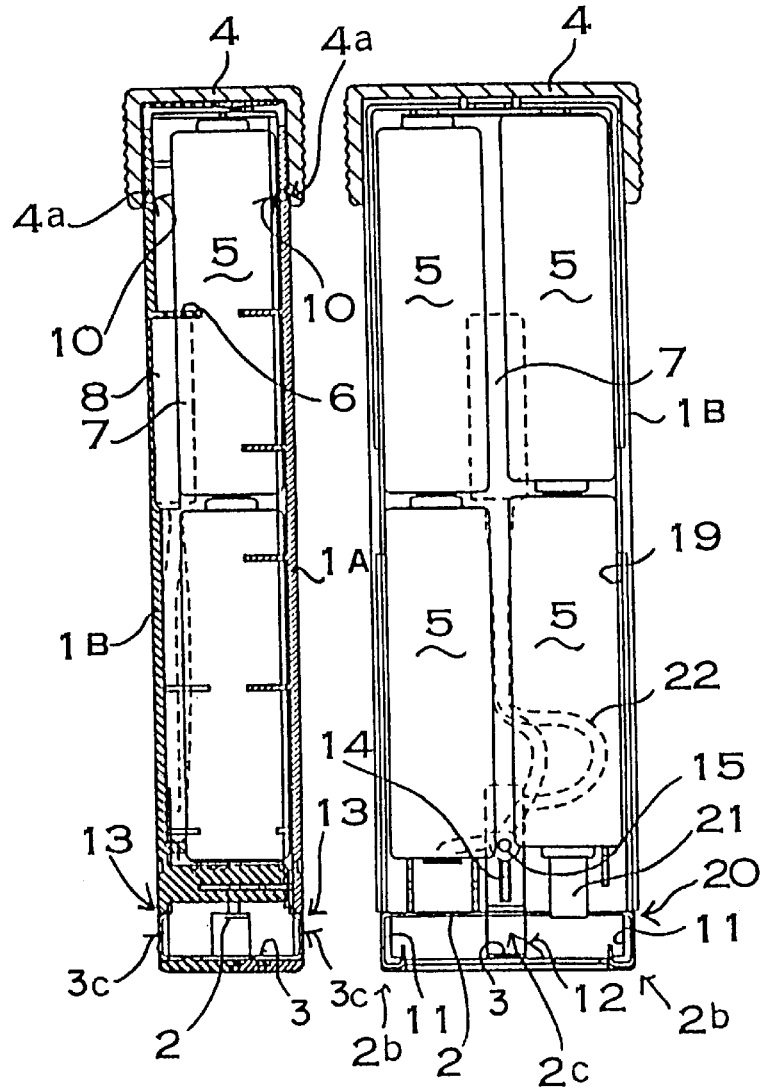
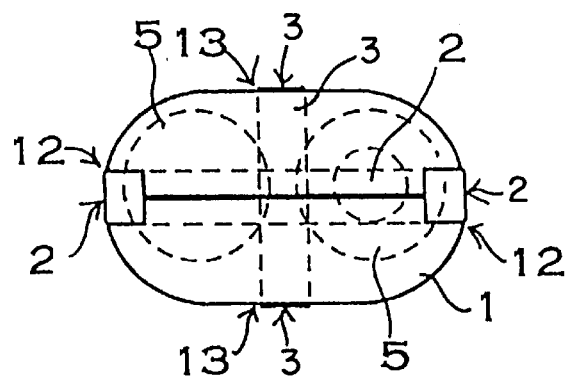

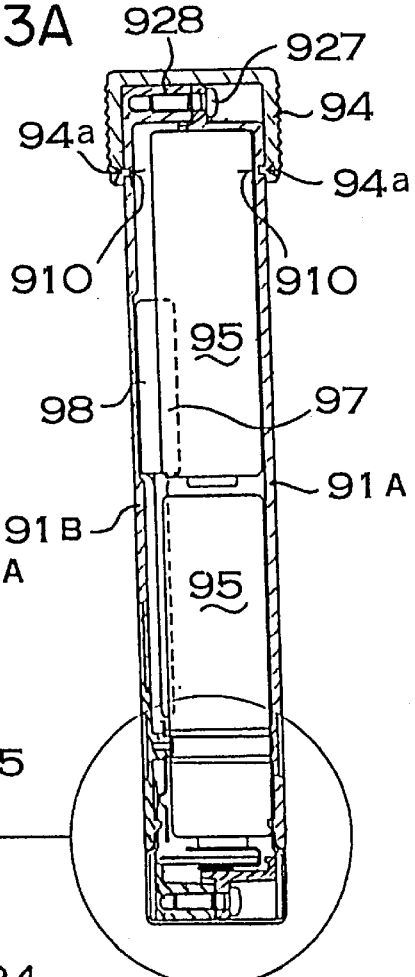
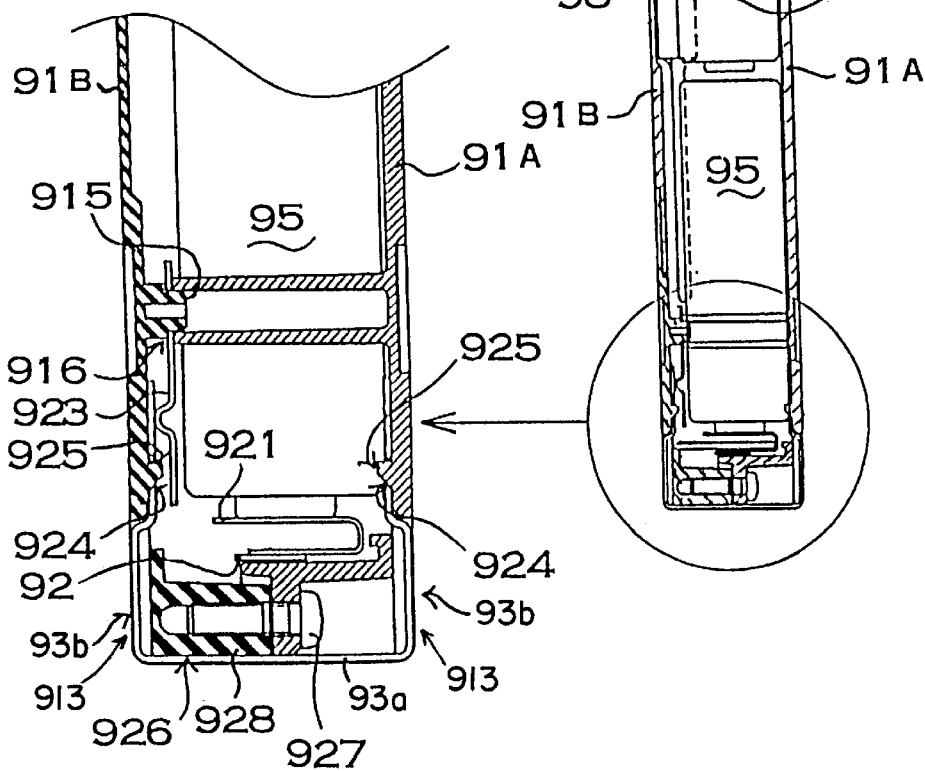
FIG. 13A
FIG. 13B
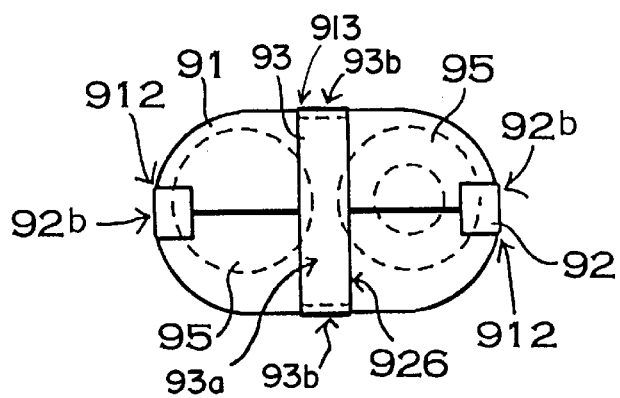
FIG. 14

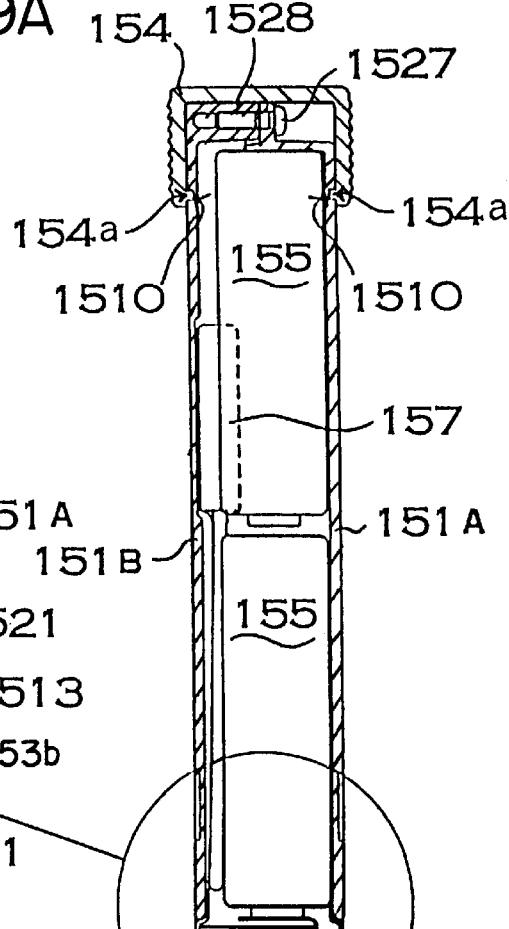
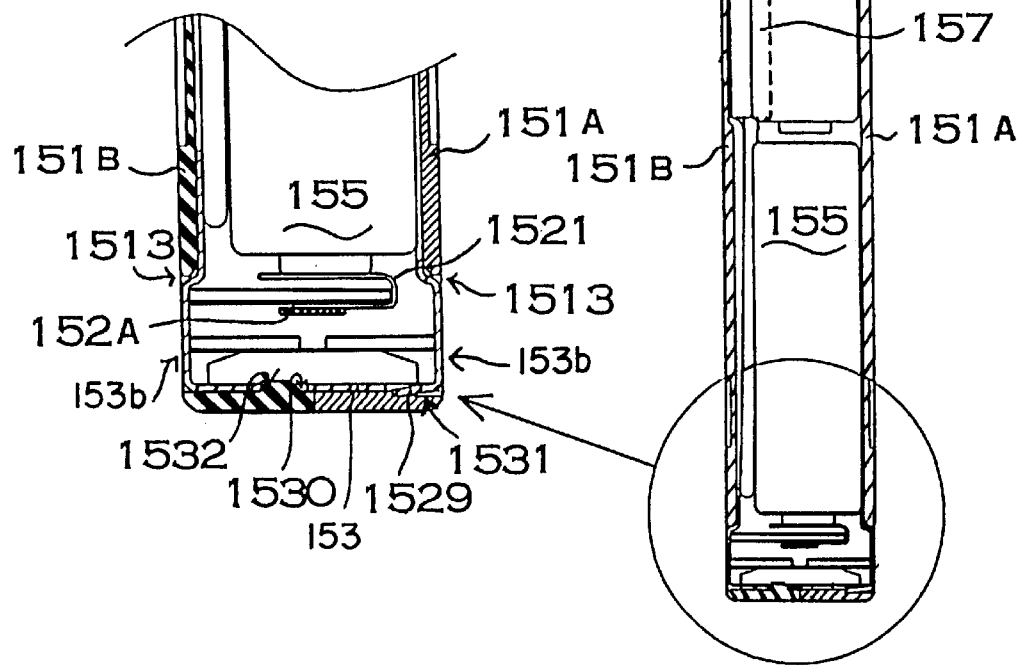
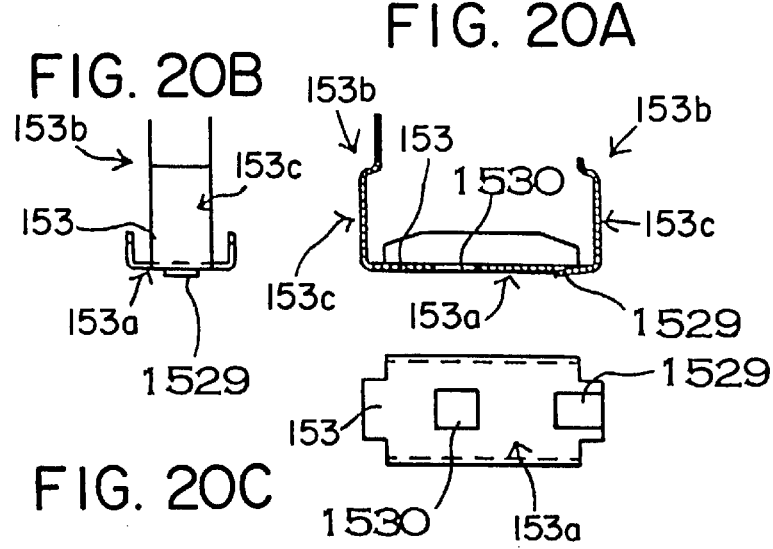

BATTERY PACK WHICH CAN BE ATTACHED INDEPENDENT OF ORIENTATION

BACKGROUND OF THE INVENTION

The present invention relates to a battery pack which can attach to electrical equipment regardless of the orientation of its front and back sides.

Battery packs in general use today have positive and negative (+ −) charge-discharge terminals disposed in opposing locations on the end of the case. If this type of battery pack is attached to an electrical apparatus with the front and back of the battery pack inverted, the + − polarity will be reversed. The electrical apparatus may malfunction when the battery pack is connected with reverse polarity. In addition, large currents can flow in the battery pack and electrical apparatus resulting in heating to abnormally high temperatures.

To prevent these harmful effects, battery packs have been configured so they cannot be connected with reverse polarity. Namely, the battery pack and electrical apparatus have been made in special shapes that allow attachment in one orientation only. As a result, the battery pack and the battery pack attachment section of the electrical apparatus must be formed in complex shapes. In addition, the user must determine the proper battery pack attachment orientation judging from the shapes of the battery pack and the electrical apparatus. This makes it more difficult to simply attach the battery pack to the electrical apparatus. Therefore, this system also has the drawback that children, the aged, and users who are not mechanically inclined cannot use it conveniently.

This drawback can be eliminated by a battery pack configuration that allows attachment without regard to the orientation of the front and back of the battery pack. Namely, this drawback can be eliminated by a battery pack which can be rotated 180° and still be attached. A battery pack which realizes such a configuration is cited, for example, in Japanese Non-Examined Utility Model Publication No. 2-12157 issued Jan. 25, 1990. As shown in FIG. 1, the battery pack cited in this disclosure has a positive charge-discharge terminal 102 disposed at the center of one end of the case 101 and negative charge-discharge terminals 102 disposed on both sides of the positive terminal 102. This results in attachment without specified orientation.

The battery pack shown in FIG. 1 can reliably connect its + − charge-discharge terminals 102 to the electrical apparatus even when the battery pack is rotated 180° and attached with the front and back reversed. Therefore, it has the feature that it can be easily attached while ignoring the attachment orientation. However, this type of battery pack has the drawback that it is difficult to accurately mount the charge-discharge terminals 102 in the specified locations on the case 101. Further, since the + − charge-discharge terminals 102 which are exposed outside the case 101 connect internally through leads 103, assembly of this structure is difficult. Finally, this structure also has the drawback that it is difficult to reliably prevent internal short circuiting of the + − leads 103 and the charge-discharge terminals 102.

The present invention was developed to overcome these and other drawbacks. It is thus a primary object of the present invention to provide a battery pack which can be attached independent of orientation wherein the + − charge-discharge terminals can be simply, easily, and accurately mounted in the specified locations on the case without short circuiting.

The above and further objects and features of the invention will more fully be apparent from the following detailed description with accompanying drawings.

SUMMARY OF THE INVENTION

The battery pack of the present invention houses rechargeable batteries inside its case and is provided with + − charge-discharge terminals at one end of the case. The charge-discharge terminals are mounted on the case in a manner allowing attachment to an electrical apparatus with 180° rotation of the case, that is without regard to orientation of the front and back of the case.

Further, the battery pack which can be attached independent of orientation of the present invention is provided with the following unique structure. Each set of + or − charge-discharge terminals is a sheet metal piece bent in a flat-sided c-shape to form a main body section connected to bent sections on either side. The + − charge-discharge terminals are made up of a parallel charge-discharge terminal piece and a perpendicular charge-discharge terminal piece. The parallel charge-discharge terminal piece is mounted on the case parallel to the plane of the case opening. The perpendicular charge-discharge terminal piece is mounted on the case perpendicular to the parallel charge-discharge terminal piece. The parallel charge-discharge terminal piece mounts by fitting into an attachment section formed as a single piece with the open case section. The parallel charge-discharge terminal piece is mounted with both surfaces of the main body section and bent sections parallel to the direction for case separation. This allows the two halves of the divided case to connect by parallel movement. The perpendicular charge-discharge terminal piece is mounted with both ends connecting the halves of the divided case. The perpendicular charge-discharge terminal piece is mounted with both surfaces of the main body section parallel to the direction for case separation. The parallel charge-discharge terminal piece and the perpendicular charge-discharge terminal piece are mounted in a mutually perpendicular fashion with the open sides of their c-shapes facing in mutual opposition.

This configuration of the battery pack has the feature that short circuits between the + − charge-discharge terminals are effectively prevented, and that the + − charge-discharge terminals can be simply, easily, and accurately mounted in specified locations in the case. This is because the + − charge-discharge terminals are made up of sheet metal bent into flat-sided c-shaped pieces, the parallel charge-discharge terminal piece and the perpendicular charge-discharge terminal piece. The parallel charge-discharge terminal piece fits in an attachment section provided in the case opening. The parallel charge-discharge terminal piece and the perpendicular charge-discharge terminal piece attach to the case with the open sides of their c-shapes facing in opposition. Finally, the bent sections provided at both ends of the perpendicular charge-discharge terminal piece connect the two halves of the divided case. In this configuration of battery pack, the parallel charge-discharge terminal piece is mounted in the case opening and then the case halves are connected. The perpendicular charge-discharge terminal piece is installed prior to connecting the case halves or after connecting the case halves.

BRIEF DESCRIPTION OF THE DRAWINGS

FIGS. 7A-B are cross-section views of an embodiment of the battery pack of the present invention which can be attached independent of orientation.

FIG. 8 is a bottom view of an embodiment of the battery pack of the present invention which can be attached independent of orientation.

FIG. 13A is a view of a second embodiment of the battery pack of the present invention, and FIG. 13B is a partially enlarged cross-section view of the battery pack shown in FIG. 13A which can be attached independent of orientation.

FIG. 14 is a bottom view of a second embodiment of the battery pack of the present invention which can be attached independent of orientation.

FIG. 19A is a view of a third embodiment of the battery pack of the present invention, and FIG. 19B is a partially enlarged cross-section view of the battery pack shown in FIG. 19A which can be attached independent of orientation.

FIG. 20A is a cross-section view,

FIG. 20B is a side view, and

FIG. 20C is a bottom view of the perpendicular charge-discharge terminal piece of a third embodiment of the present invention.

DETAILED DESCRIPTION OF THE INVENTION

Figure 1:
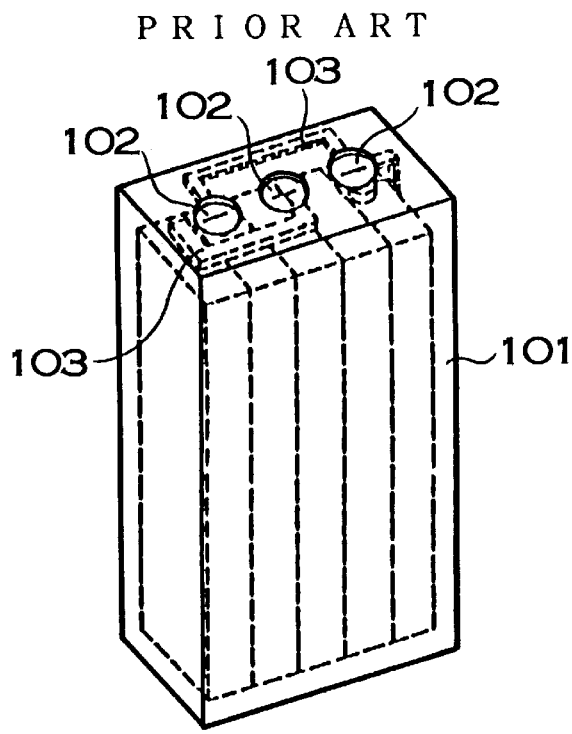
FIG. 1 is an oblique view of a prior art battery pack which can be attached independent of orientation.

Turning to FIGS. 2 through 6, a battery pack which can be attached independent of orientation is provided with a case 1 which separates into two pieces, a cap 4 which connects on the aft end of the case 1, four rechargeable batteries 5 which are housed in the case 1, and + − charge-discharge terminals 2 which attach to the case 1.

The case 1 is made up of case halves 1A and 1B formed from plastic. Case 1A and case 1B are formed in a shape that allows four rechargeable batteries 5 to be held inside when arranged in two rows. A plurality of lateral ribs 6 are formed integrally on the inside surface of the case 1 as a single piece with the case 1 to retain the batteries in fixed positions. The upper surfaces of the lateral ribs 6 are curved to conform to the shape of the rechargeable batteries 5. Further, in the center region of the lateral ribs 6, a partition 8 enclosing a rectangular circuit breaker 7 in a fixed position is also formed as a single piece with the case 1.

Fastener windows 9 are formed in five locations as a single piece with case 1B to allow the case halves 1A and 1B to be joined with the rechargeable batteries 5 contained inside. The fastener windows 9 are formed with case 1B, and project out from the edges of the opening of case 1B. The fastener windows 9 are provided in two locations on the front end edge which exposes charge-discharge terminals to the exterior of the case 1, in the center of both side edges, and in one location on the aft end edge of the case. When the case halves 1A and 1B are joined, the fastener windows 9 project into the inside surface of case 1A. In locations where the fastener windows 9 are inserted, case 1A has hooks (not illustrated) which are formed integrally as a single piece with case 1A. When the two case halves 1A and 1B are joined together, the hooks engage with the fastener windows 9 to connect case 1A to case 1B. Further, as shown in the figures, the case 1 is inserted into the aft end cap 4 to more reliably join the two case halves 1A and 1B. This structure has the feature that case 1A and case 1B can be easily joined without using locking screws or bolts.

The cap 4 is formed with an interior shape that allows insertion of the aft end of the connected case 1. Further, the cap 4 is formed in a configuration that does not allow it to be pulled off once the aft end of the case 1 is inserted. To achieve this, the cap 4 shown in the cross-section of FIG. 7 is provided with projections 4a on its inner surface and the case 1 is provided with detents 10 for receiving the projections 4a. The projections 4a insert into the detents 10 and the cap 4 attaches to the case 1 in a manner that cannot be dislodged. The outer surfaces of the cap 4 are provided with rough topology to avoid slipping when grasped. The battery pack, with the cap 4 fixed to its aft end, has the feature that not only does the cap 4 reliably hold the case 1 together, but it also allows the battery pack to be easily engaged and disengaged from electrical equipment by grasping the cap 4.

Alignment ribs 11 are formed integrally as a single piece in the corners of the front end of the case 1A and case 1B creating attachment sections 1a to fit one part of the charge-discharge terminals, namely a parallel charge-discharge terminal piece 2, and maintain it in a fixed location. The alignment ribs 11 are formed as a single piece in L-shapes in the corners of the case opening.

Electrode windows 12 are opened through case 1A and case 1B outside the alignment ribs 11 to expose bent sections 2b of the parallel charge-discharge terminal piece 2 outside the case 1. In addition, electrode windows 13 are also opened through case 1A and case 1B to expose bent sections 3b of a perpendicular charge-discharge terminal piece 3 outside the case 1. The perpendicular charge-discharge terminal piece 3 mounts in the case 1 perpendicular to the parallel charge-discharge terminal piece 2.

Further, rib 14 and projection 15 are formed integrally as a single piece on the inner surface of case 1B for mounting the perpendicular charge-discharge terminal piece 2 in a fixed position. The projection 15 is disposed in a location to insert into a hole 16 provided through a bent section 3b of the perpendicular charge-discharge terminal piece 3. The rib 14 is disposed in a location to insert through a slit 17 provided in bent section 3b of the perpendicular charge-discharge terminal piece 3. After insertion of the projection 15 through the hole 16 in bent section 3b, the tip of projection 15 is pressed and heated to fix the perpendicular charge-discharge terminal piece 3 to the case 1B.

The rib 14 is inserted through the slit 17 in the perpendicular charge-discharge terminal piece 3 and prevents movement of the perpendicular charge-discharge terminal piece 2B out of position. The perpendicular charge-discharge terminal piece 3 is joined to case 1B via projection 15 and hole 16 and can rotate around projection 15 as a pivot point, but rib 14 and slit 17 prevent that rotation and accurately retain the perpendicular charge-discharge terminal piece 3 in proper position. Further, the rib 14 passes through slit 17 in the perpendicular charge-discharge terminal piece 3 and presses the inside of the bent section 3b on the opposite side against the inner surface of case 1A. Thus the perpendicular charge-discharge terminal piece 3 with its bent section 3b pressed by the end of rib 14 is effectively prevented from shape distortion leading to poor electrical contact even when pressed upon through the case 1 electrode window 13. Specifically, the rib 14 serves not only to accurately retain the perpendicular charge-discharge terminal piece 3 in position, but also serves to insure electrical connection to an electrical apparatus.

Figure 4:
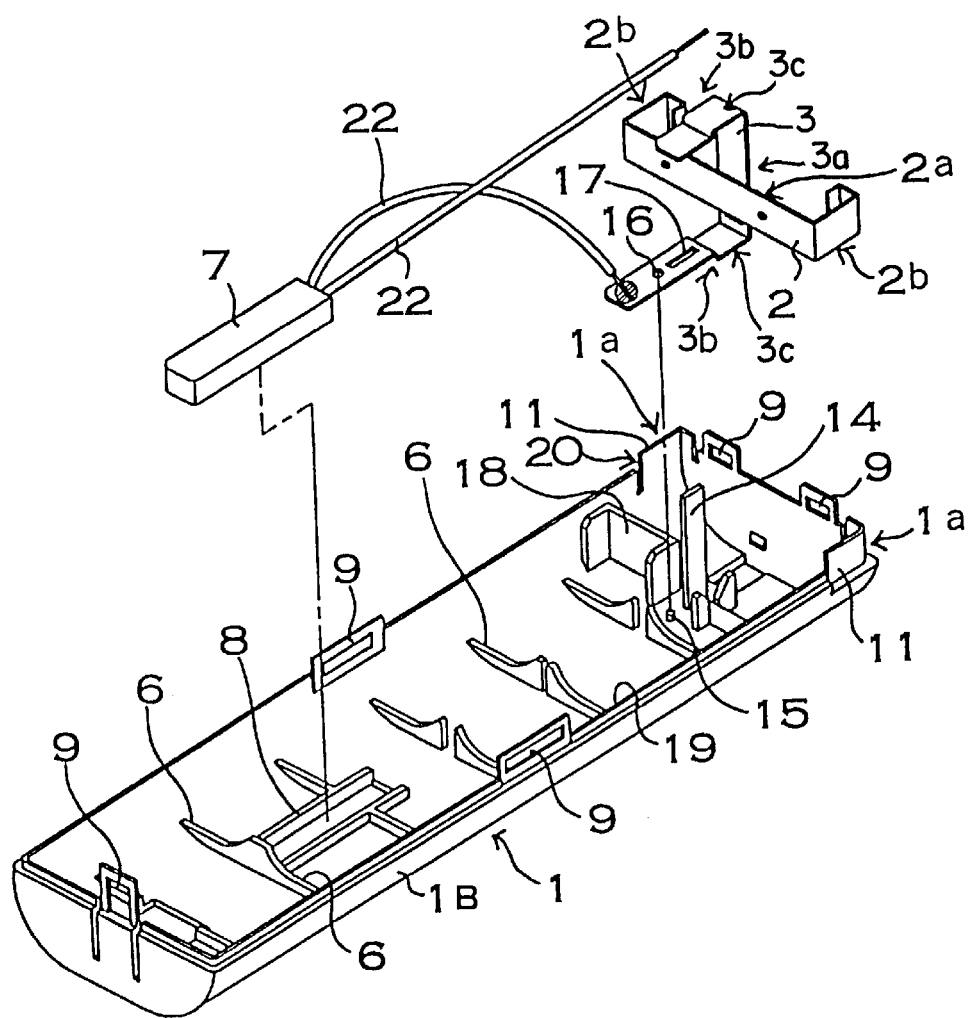
FIG. 4 is an exploded perspective view showing the manufacturing process of an embodiment of the battery pack of the present invention which can be attached independent of orientation.

Further, as shown in the figures, a support rib 18 is formed integrally as a single piece on the inside surface of case 1B to prevent movement of the rechargeable batteries 5 as a result of mechanical shock. It is possible to imagine rechargeable batteries 5 moving out of position and short circuiting due to mechanical shock such as dropping the battery pack. The support rib 18 is disposed between the rechargeable batteries 5 and the charge-discharge terminals 2, 3 and prevents movement of the rechargeable batteries 5 towards the charge-discharge terminals. As shown in FIG. 4, the support rib 18 is formed as a single piece in a flat sided c-shape disposed at the end of the rechargeable batteries 5 arranged in two rows. When mechanical shock tries to move the rechargeable batteries 5 towards the charge-discharge terminals 2, 3 the flat-sided c-shaped support rib 18 reliably stops this movement to effectively prevent battery pack internal short circuits.

The charge-discharge terminals are made up of a parallel charge-discharge terminal piece 2 and a perpendicular charge-discharge terminal piece 3. The parallel charge-discharge terminal piece 2 and the perpendicular charge-discharge terminal piece 3 are fabricated by bending sheet metal into flat-sided c-shapes. The flat-sided c-shaped charge-discharge terminals take the form of a main body section 2a, 3a joined to bent sections 2a, 3b on either side. The battery pack shown in the figures has charge-discharge terminals 2, 3 with a parallel charge-discharge terminal piece 2 which is positive and a perpendicular charge-discharge terminal piece 3 which is negative. However, the polarity of the charge-discharge terminals 2,3 can be reversed.

Figure 3:
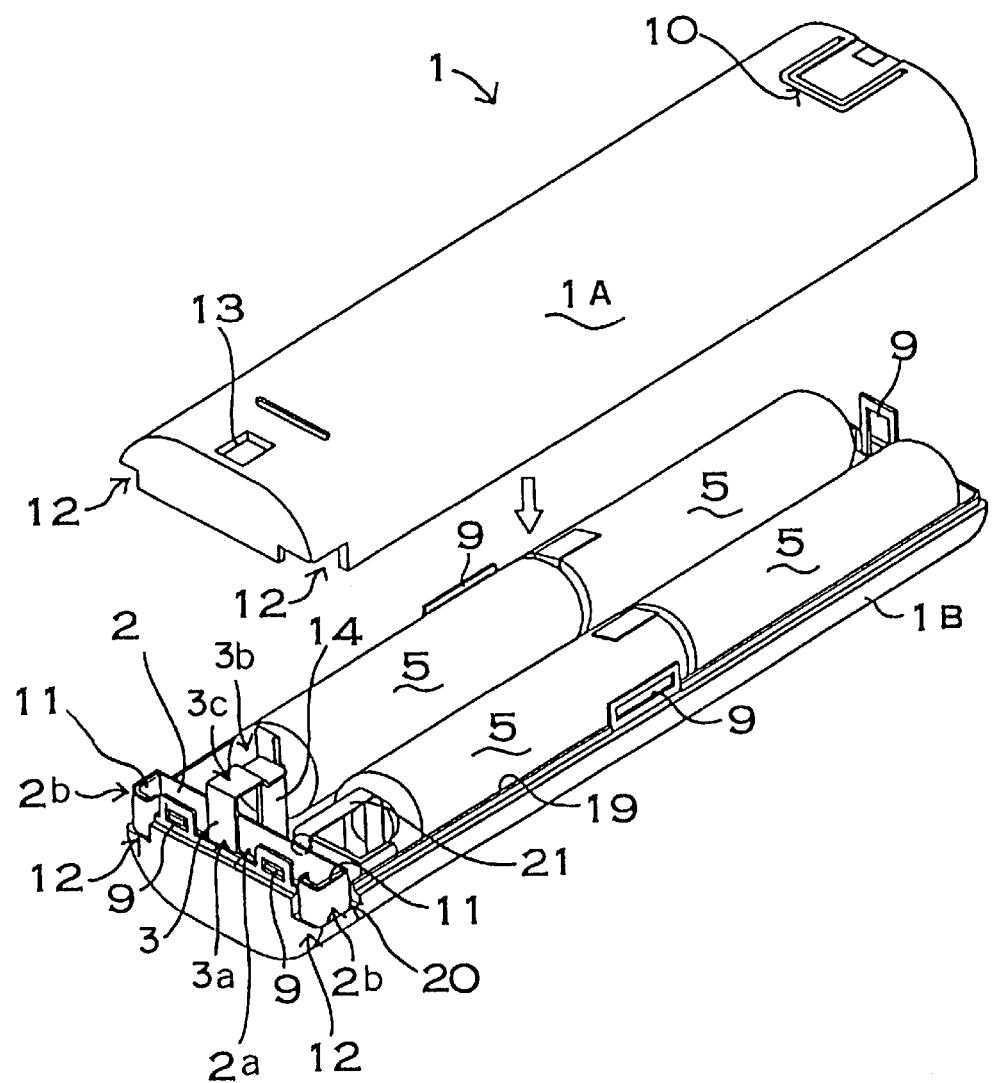
FIG. 3 is an exploded perspective view showing the manufacturing process of an embodiment of the battery pack of the present invention which can be attached independent of orientation.

The parallel charge-discharge terminal piece 2 mounts along the edge of the case 1 opening. The end portions of the bent sections 2b of the parallel charge-discharge terminal piece 2 are bent inward again, and the bent sections 2b attach around the outside of the alignment ribs 11 provided on the case 1 to dispose the parallel charge-discharge terminal piece in a fixed location in the case 1. The parallel charge-discharge terminal piece 2 mounts at the interface region of case halves 1A and 1B with the open side of its c-shape facing towards the front end of the case 1. In other words, as shown in FIG. 3, the parallel charge-discharge terminal piece 2A mounts with its main body section positioned towards the interior of the case 1 and its bent sections 2b extending towards the front end of the case 1. Both ends of the main body section 2a of the parallel charge-discharge terminal piece 2 fit into grooves 20 provided between alignment ribs 11 and a case a perimeter rib 19 to prevent fore and aft movement with respect to the case.

To allow the case halves 1A and 1B to be joined together, both surfaces of the main body section 2a and of the bent sections 2b of the parallel charge-discharge terminal piece 2 are parallel to the direction of separation of the case 1 when the parallel charge-discharge terminal piece 2 is installed in the case 1B. The parallel charge-discharge terminal piece 2 installed in case 1B connects to the positive terminal of the rechargeable batteries 5 via leads 21.

The bent sections 3b of the perpendicular charge-discharge terminal piece 3 connect across the case halves 1A and 1B. The bent sections 3b of the perpendicular charge-discharge terminal piece 3 fit into the electrode windows 13 of case 1A and case 1B, and are provided with projecting sections 3c which protrude from the electrode windows 13 out of the case 1. As shown in FIG. 4, the lower end bent section 3b of the perpendicular charge-discharge terminal piece 3 is longer than the upper end bent section 3b, and is provided with the hole 16 and slit 17. The hole 16 is opened at a location for receiving the projection 15 on the case 1B, and the slit 17 is opened at a location for receiving the rib 14 on the case 1B. In addition, the lower end bent section 3b is further extended beyond the hole 16 region, and a lead wire 22 is soldered to its end. The lead wire 22 is connected to the negative terminal of the rechargeable batteries 5 through a circuit breaker 7.

The direction of the open side of the c-shaped perpendicular charge-discharge terminal piece 3 is opposite of that of the parallel charge-discharge terminal piece 2. As shown in FIG. 3, the main body section 3a of the perpendicular charge-discharge terminal piece 3 is disposed against the inside surface of the front end of the case 1, and the bent sections 3b extend from the front end towards the aft end of the case 1. Thus the perpendicular charge-discharge terminal piece 3 is installed in the case 1 with the open side of its c-shape facing aft.

A battery pack with the structure described above is assembled in the following fashion.

(1) As shown in FIG. 4, lead wire 22 is soldered to the end of the bent section 3b of the perpendicular charge-discharge terminal piece 3 connecting the circuit breaker 7.

Figure 5:
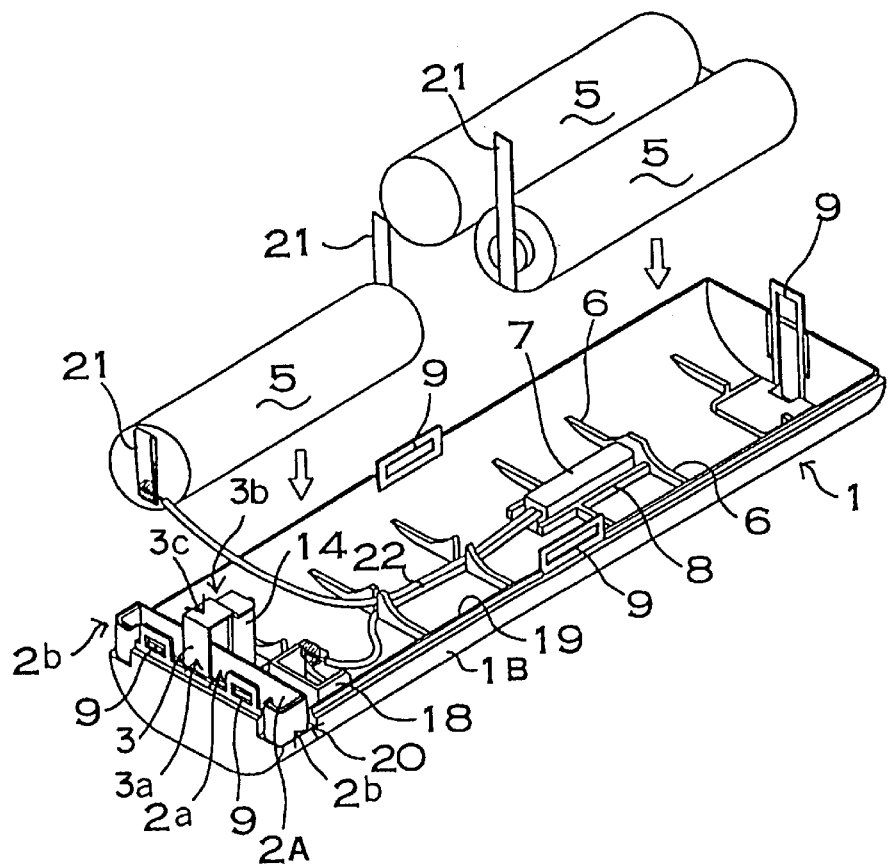
FIG. 5 is an exploded perspective view showing the manufacturing process of an embodiment of the battery pack of the present invention which can be attached independent of orientation.

(2) The perpendicular charge-discharge terminal piece 3 and the parallel charge-discharge terminal piece 2 are installed in case 1B as shown in FIG. 5 with the open sides of their c-shapes facing in mutual opposition. The circuit breaker 7 is solder connected to the negative terminal of the rechargeable batteries 5.

Figure 6:
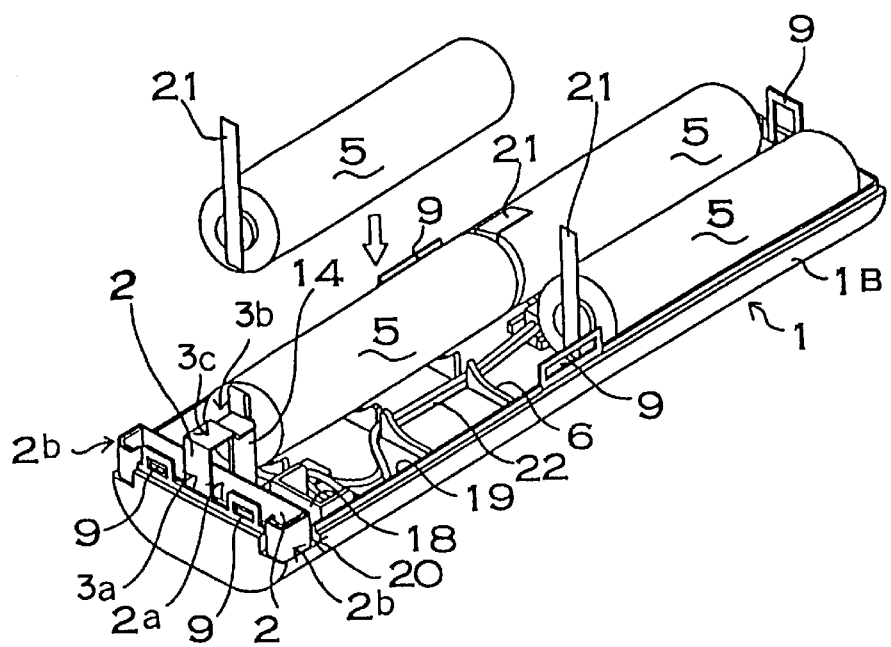
FIG. 6 is an exploded perspective view showing the manufacturing process of an embodiment of the battery pack of the present invention which can be attached independent of orientation.

(3) As shown in FIG. 6, after three rechargeable batteries 5 are inserted in case 1B, the final rechargeable battery 5 is also inserted.

(4) After leads 21 are connected to the four rechargeable batteries 5, the positive terminal of the rechargeable batteries 5 is connected to the parallel charge-discharge terminal piece 2 via lead 21 as shown in FIG. 3.

(5) Case halve 1A is joined at the case opening of case halve 1B. Hooks (not illustrated) on case 1A catch in case 1B fastener windows 9 to mate case 1B and case 1A in an inseparable fashion.

Figure 2:
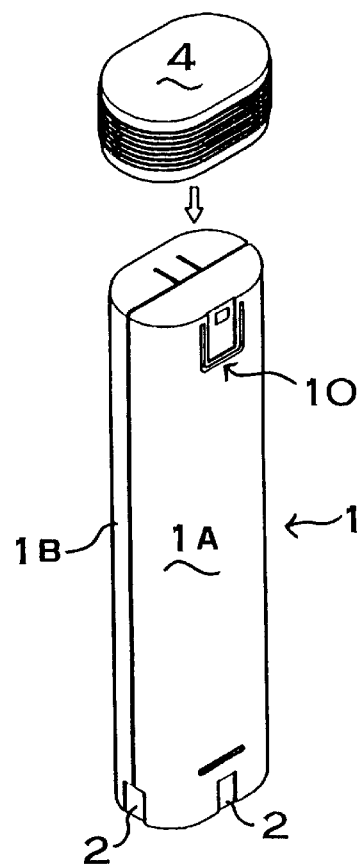
FIG. 2 is an oblique view of an embodiment of the battery pack of the present invention which can be attached independent of orientation.

(6) Finally, as shown in FIG. 2, the aft end of the case 1 is inserted into the cap 4 to insure the connection of case 1B and case 1A.

As shown in FIG. 8, the battery pack assembled in this fashion has positive charge-discharge terminals 2 exposed at both ends of the dividing line between the case 1, and has negative charge-discharge terminals 3 exposed on the surface of each of the case halves 1A and 1B.

Turning to FIGS. 9 through 14 a second embodiment of the battery pack is shown. Comparing the battery pack shown in FIGS. 9 through 13 with the battery pack shown in FIGS. 2 through 6, the perpendicular charge-discharge terminal piece 93 and the connecting structure of case halves 91A and 91B are different. The perpendicular charge-discharge terminal piece 93 of the battery pack of FIGS. 9 through 14 connects to the circuit breaker 97 through a connecting terminal 923. The connecting terminal 923 connects to the circuit breaker 97 via the lead wire 922.

Also, in FIGS. 9 through 14, reference numeral 92a denotes a main body section of charge-discharge terminal 92, reference numeral 95 denotes a rechargeable battery, reference numeral 96 denotes a lateral rib, reference numeral 98 denotes a partition, reference numeral 910 denotes a detent, reference numeral 911 denotes an alignment rib, reference numeral 912 denotes an electrode window, reference numeral 918 denotes a support rib, reference numeral 919 denotes a perimeter rib, reference numeral 920 denotes a groove, and reference numeral 921 denotes a lead.

The tip of the connecting terminal 923 makes flexible contact with the end of the perpendicular charge-discharge terminal piece 93. The connecting terminal 923 is provided with a hole 916 for insertion of a projection 915 established on the case half 91B to retain the connecting terminal 923 in a fixed position on the case half 91B. The connecting terminal 923 is fixed to the case half 91B by inserting the projection 915 through the hole 916 and pressure heating the top of the projection 915 to flatten it.

Fastening holes 924 are provided at the ends of the bent sections 93b which extend from main body section 93a of the perpendicular charge-discharge terminal piece 93. As shown in the cross-section of FIG. 13, fastening projections 925 are formed integrally as single pieces on the insides of case half 91A and case half 91B and are inserted into the fastening holes 924. For the perpendicular charge-discharge terminal piece 93 with this structure, the ends of the bent sections 93b are inserted through the electrode windows 913 into the inside surfaces of the case 91 when the two case halves 91A and 91B have been joined together. The fastening holes 924 in the bent sections 93b, inserted through the electrode windows 913, catch on the fastening projections 925 on the inside surfaces of the case 91 so as to prevent separation of the case. The perpendicular charge-discharge terminal piece 93 attached in this fashion joins case half 91A and case half 91B such that they do not open.

Figure 9:
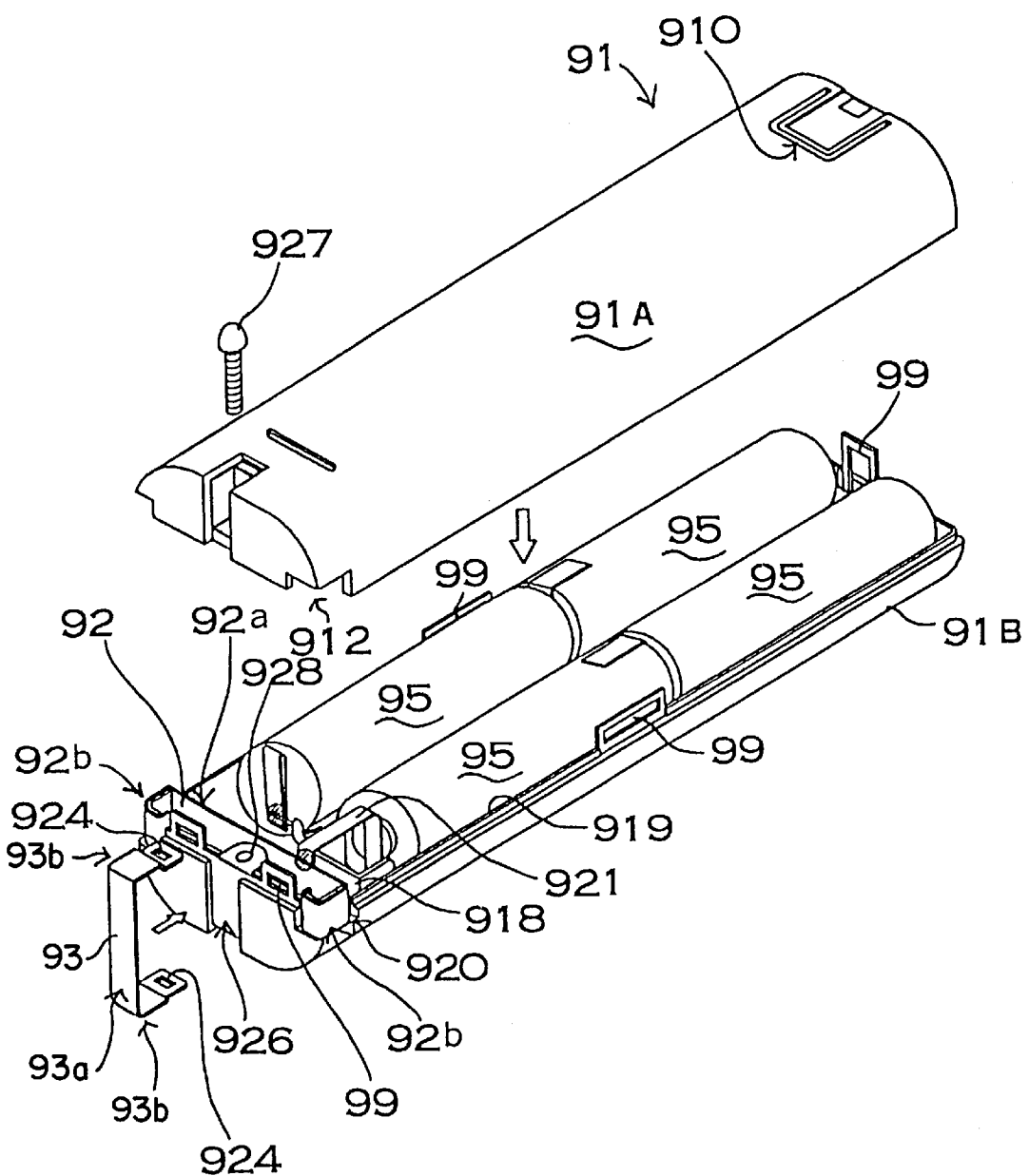
FIG. 9 is an exploded perspective view showing the manufacturing process of a second embodiment of the battery pack of the present invention which can be attached independent of orientation.
Figure 10:
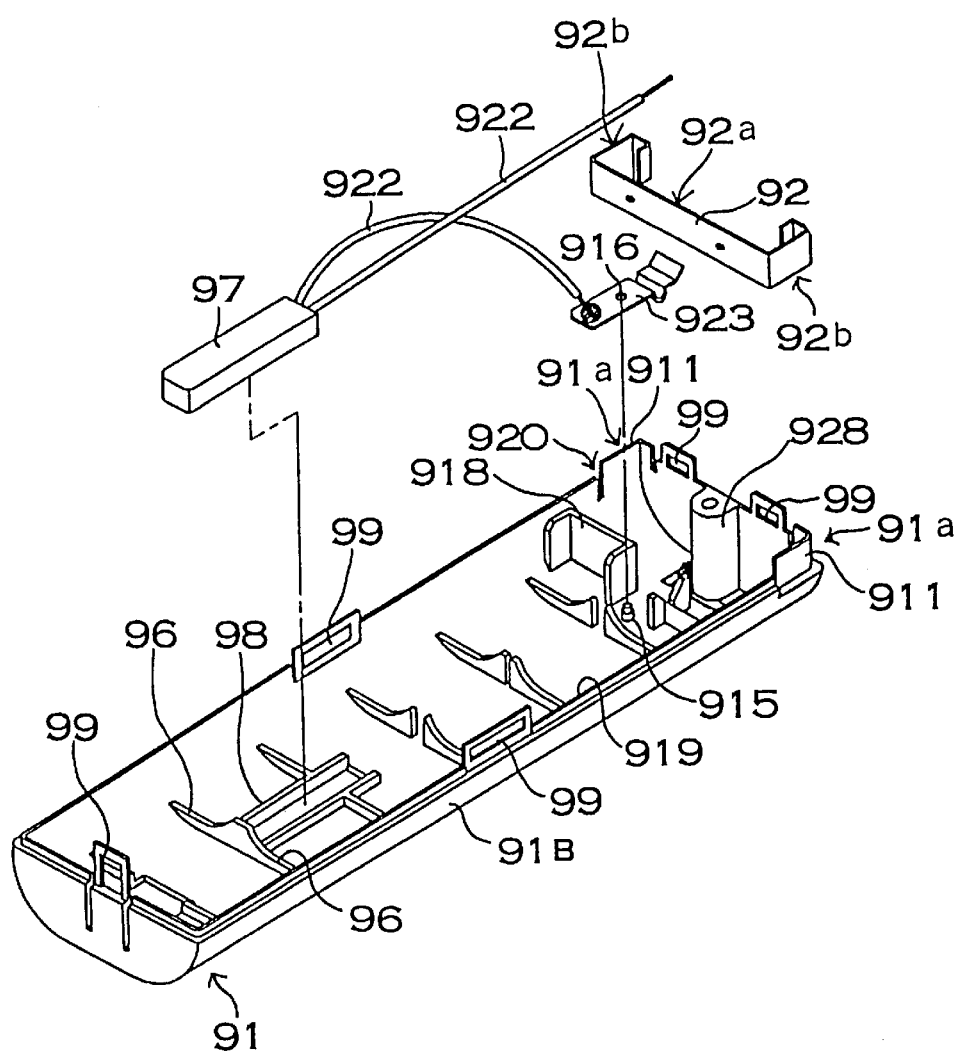
FIG. 10 is an exploded perspective view showing the manufacturing process of a second embodiment of the battery pack of the present invention which can be attached independent of orientation.
Figure 11:
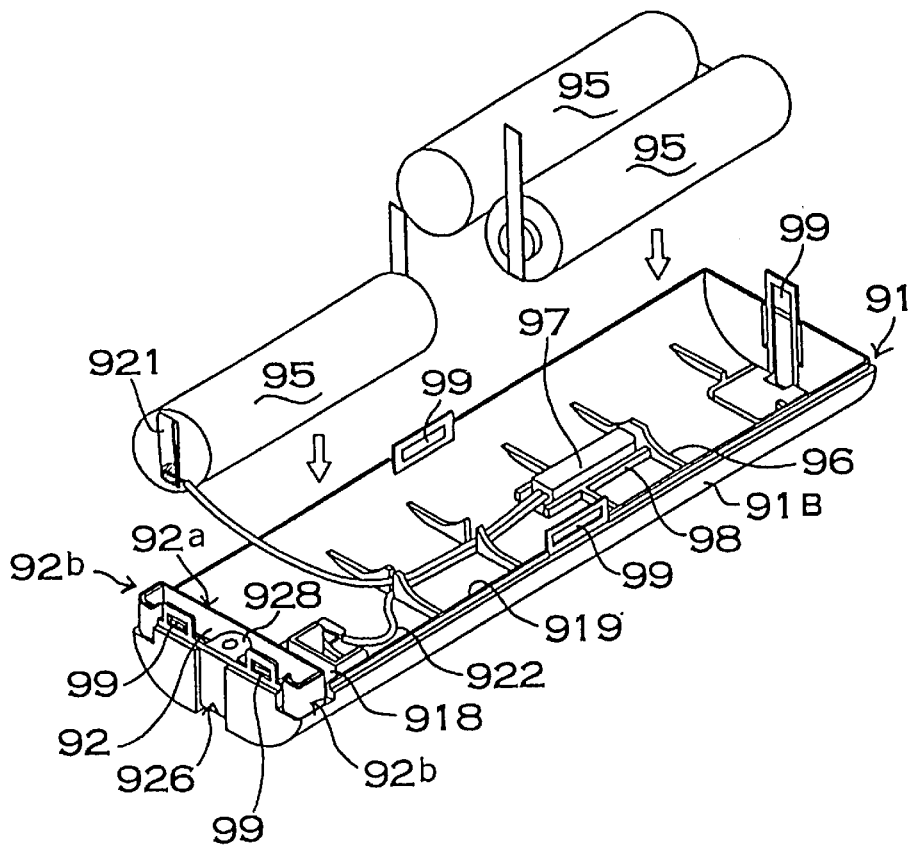
FIG. 11 is an exploded perspective view showing the manufacturing process of a second embodiment of the battery pack of the present invention which can be attached independent of orientation.
Figure 12:
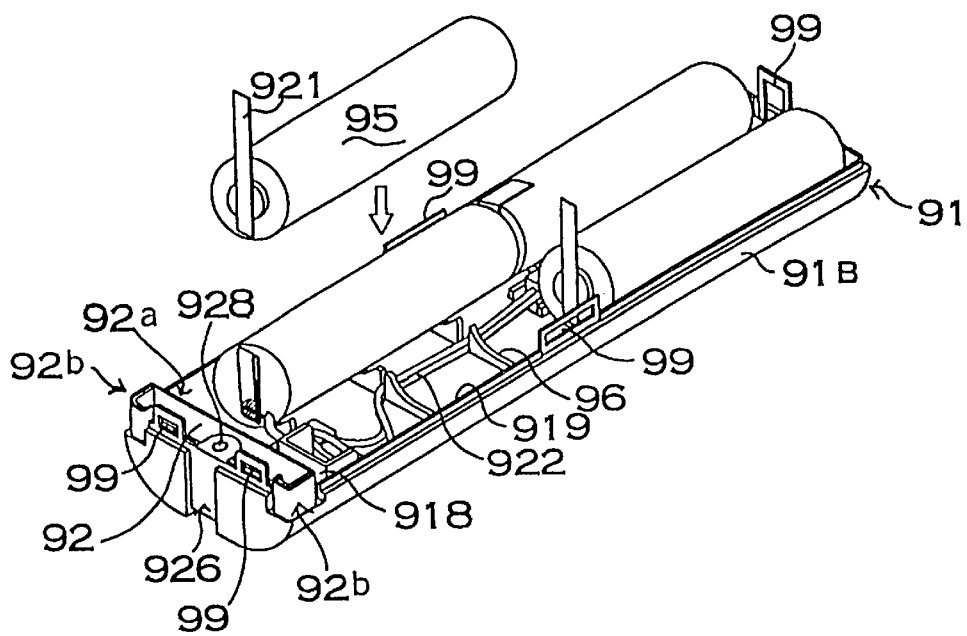
FIG. 12 is an exploded perspective view showing the manufacturing process of a second embodiment of the battery pack of the present invention which can be attached independent of orientation.

As shown in FIGS. 9 and 14, this configuration of the perpendicular charge-discharge terminal piece 93 attaches to the outside of case half 91A and case half 91B. Therefore, grooves 926 are formed in case half 91A and case half 91B to accept the main body section and part of the bent sections 93b of the perpendicular charge-discharge terminal piece 92B.

The case 91 shown in these and other figures is joined in the same manner as case 1 shown in FIGS. 2 through 6 by fastener windows 99 provided on case half 91B and hooks on case half 91A. Further, case 91 is held together by the perpendicular charge-discharge terminal piece 93. Still further, a locking screw 927 connects case 91 even more reliably. The locking screw 927 joins the halves of case 91 by passing through case half 91A and screwing into a support strut 928 provided on case half 91B. Finally, the aft end of the case 91 is inserted into cap 94 to further hold the case 91 together.

The battery pack shown in FIGS. 9 through 14 has the feature that since the perpendicular charge-discharge terminal piece 93 is attached after joining case half 91A and case half 91B, short circuits between the perpendicular charge-discharge terminal piece 93 and the parallel charge-discharge terminal piece 92 are effectively prevented at the assembly stage. It also has the feature that the perpendicular charge-discharge terminal piece 93 can be easily attached. Further, it also has the feature that since the case halves 91A and 91B are held together by the perpendicular charge-discharge terminal piece 93, the case 91 can be reliably joined together without screwing or bolting it together.

Finally turning to FIGS. 15 through 20, a third embodiment of the battery pack is shown. Comparing the battery pack shown in FIGS. 15 through 19 with the battery pack shown in FIGS. 2 through 6, the structure of the perpendicular charge-discharge terminal piece 153 is different. The battery pack of FIGS. 15 through 20 has a perpendicular charge-discharge terminal piece 153 shaped as shown in FIG. 20 attached to the case 151. The perpendicular charge-discharge terminal piece 153 of FIG. 20 has a projecting section 153c, and a main body section 153a provided with a punch-out projection 1529 and a connecting hole 1530. Further, both sides of the main body section 153a are bent to reinforce the main body section 153a.

Also, in FIGS. 15 through 19, reference numeral 154 denotes a cap, reference numeral 156 denotes a lateral rib, reference numeral 157 denotes a circuit breaker, reference numeral 158 denotes a partition, reference numeral 159 denotes a fastener window, reference numeral 1510 denotes a detent, reference numeral 1511 denotes an alignment rib, reference numeral 1512 denotes an electrode window, reference numeral 1513 denotes an electrode window, reference numeral 1518 denotes a support rib, reference numeral 1519 denotes a perimeter rib, reference numeral 1520 denotes a groove, reference numeral 1522 denotes a lead wire, reference numeral 1527 denotes a locking screw, and reference numeral 1528 denotes a support strut.

The punch-out projection 1529 connects to case half 151A and the connecting hole 1530 connects to case half 151B. Consequently, as shown in FIG. 19, case half 151A is provided with a locking detent 1531 on its inside surface to mate with the punch-out projection 1529. A locking projection 1532 for insertion into the connecting hole 1530 is formed as a single piece on the inside surface of case half 151B. When the case halves 151A and 151B are joined with the perpendicular charge-discharge terminal piece 153 installed in the prescribed location, the punch-out projection 1529 catches in the locking detent 1531 and the connecting hole 1530 engages with the locking projection 1532. Thus the case halves 151A and 151B are connected such that they cannot open by the main body section 153*a* of the perpendicular charge-discharge terminal piece 153.

Further, the perpendicular charge-discharge terminal piece 153 is provided with a hole 1516 and slit 1517 in its bent section 153b for attachment to case 151B in the same manner as the perpendicular charge-discharge terminal piece 153 shown in FIGS. 2 through 6. Projection 1515 which is formed as a single piece on case 151B inserts through the hole 1516, and projection 1515 is flattened by heat and pressure to fix the perpendicular charge-discharge terminal piece 153 to the case half 151B.

Figure 15:
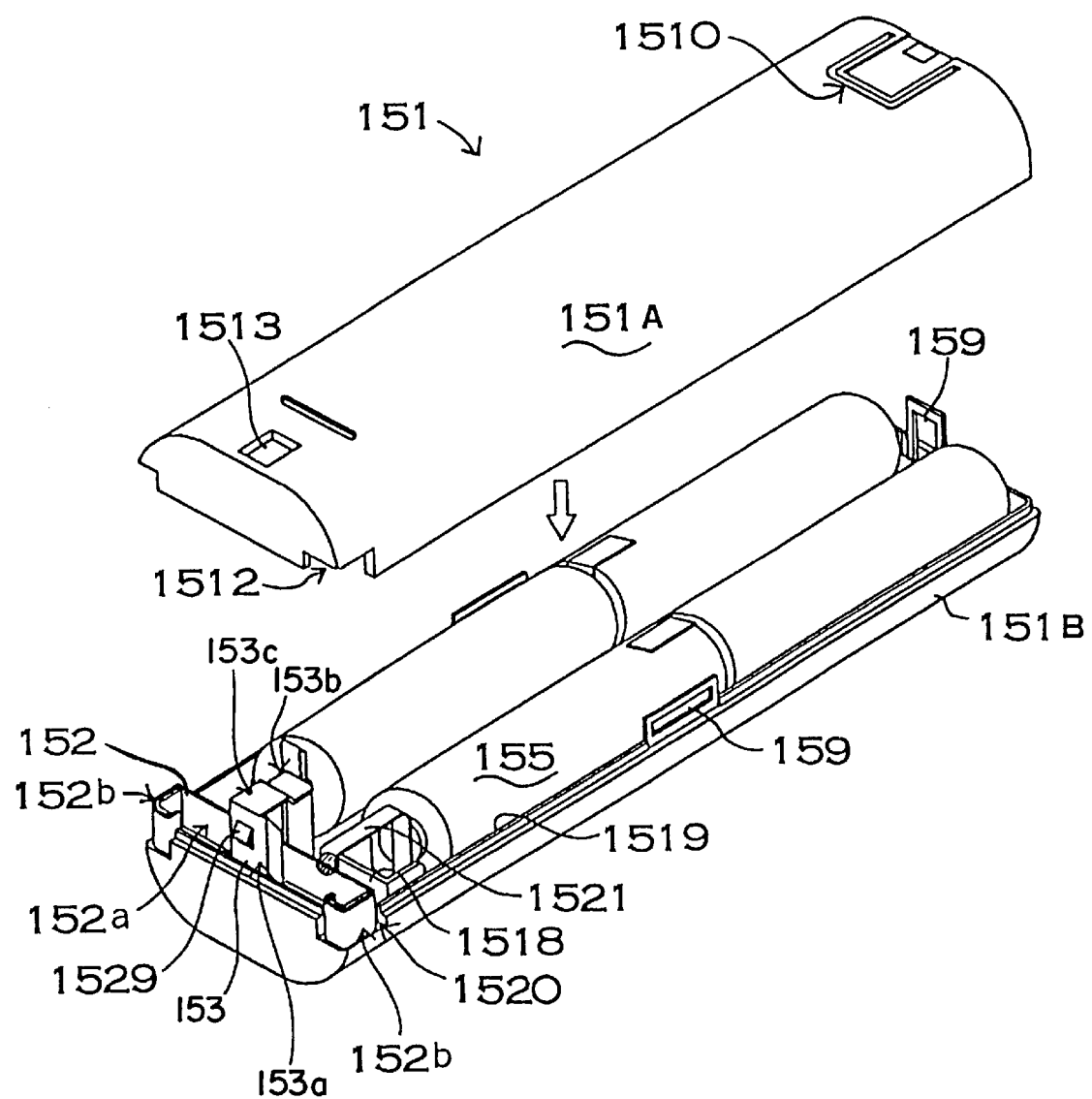
FIG. 15 is an exploded perspective view showing the manufacturing process of a third embodiment of the battery pack of the present invention which can be attached independent of orientation.
Figure 16:
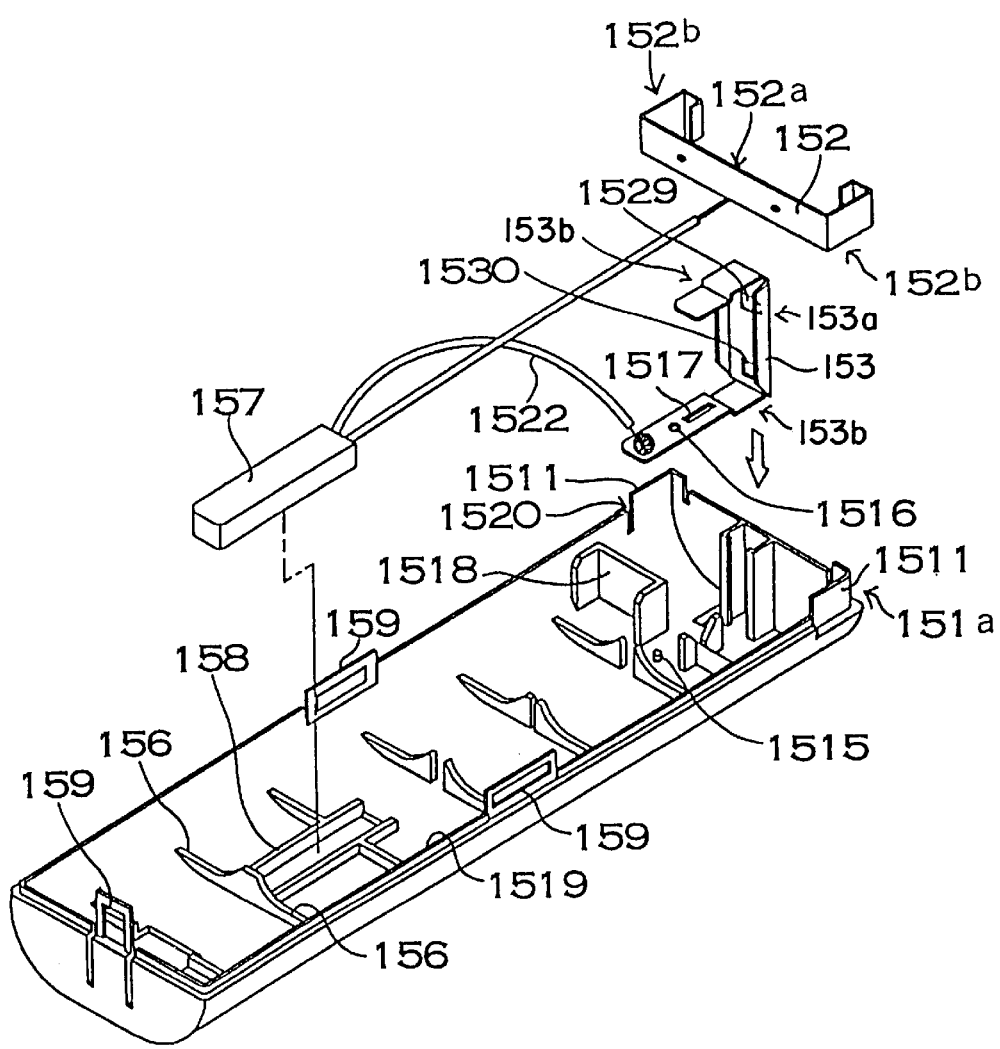
FIG. 16 is an exploded perspective view showing the manufacturing process of a third embodiment of the battery pack of the present invention which can be attached independent of orientation.
Figure 17:
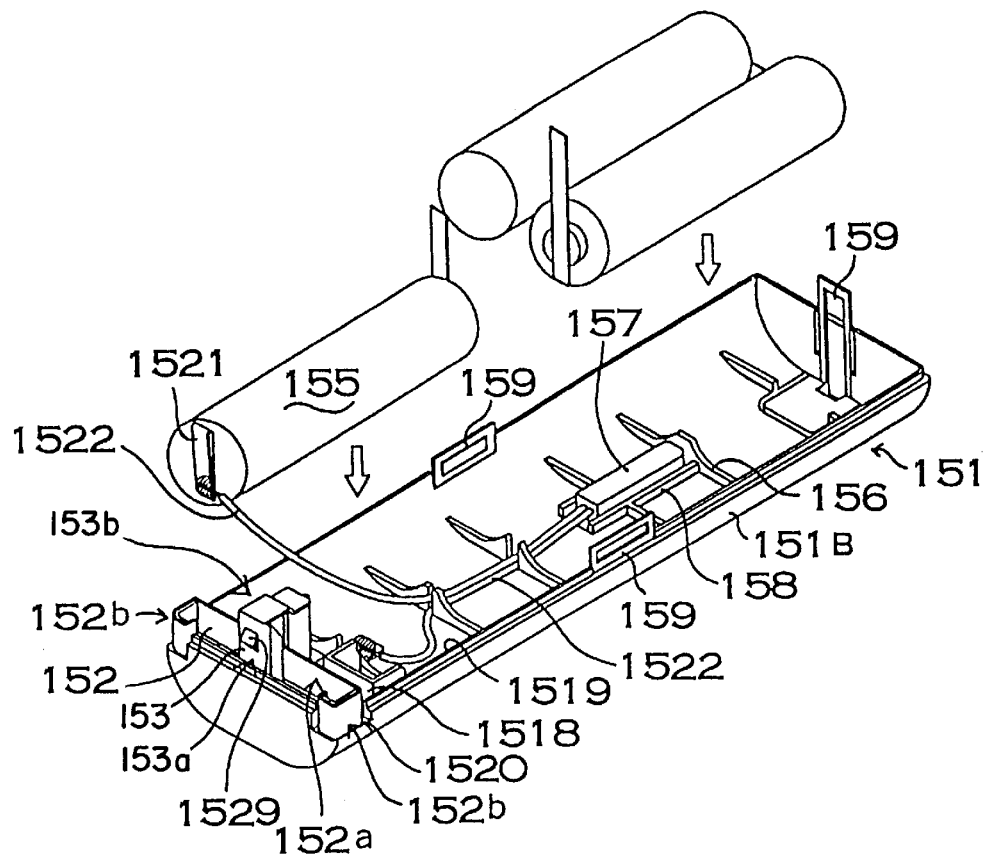
FIG. 17 is an exploded perspective view showing the manufacturing process of a third embodiment of the battery pack of the present invention which can be attached independent of orientation.
Figure 18:
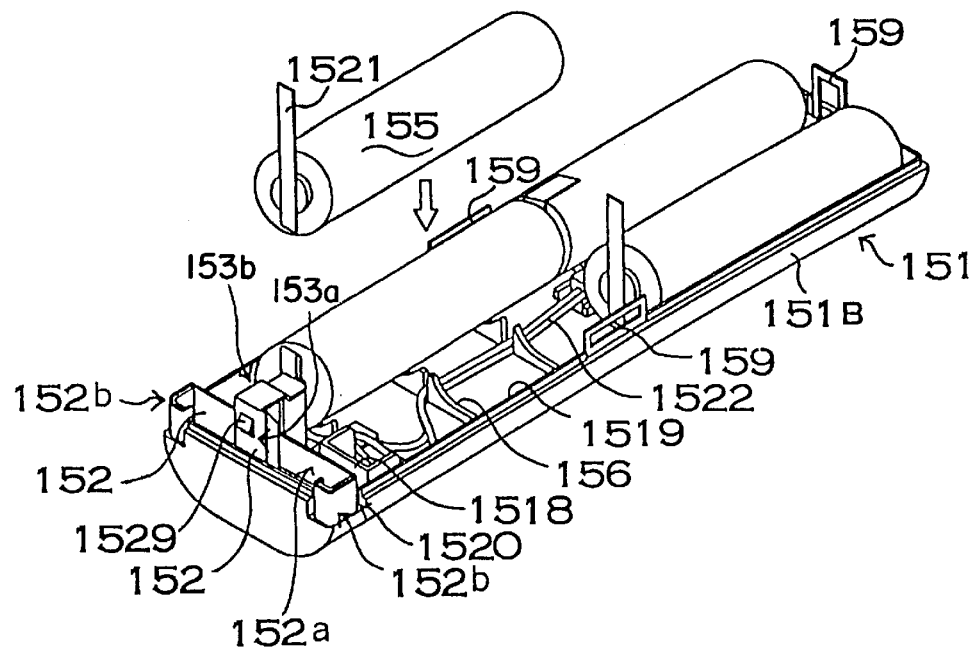
FIG. 18 is an exploded perspective view showing the manufacturing process of a third embodiment of the battery pack of the present invention which can be attached independent of orientation.
Figure 21:
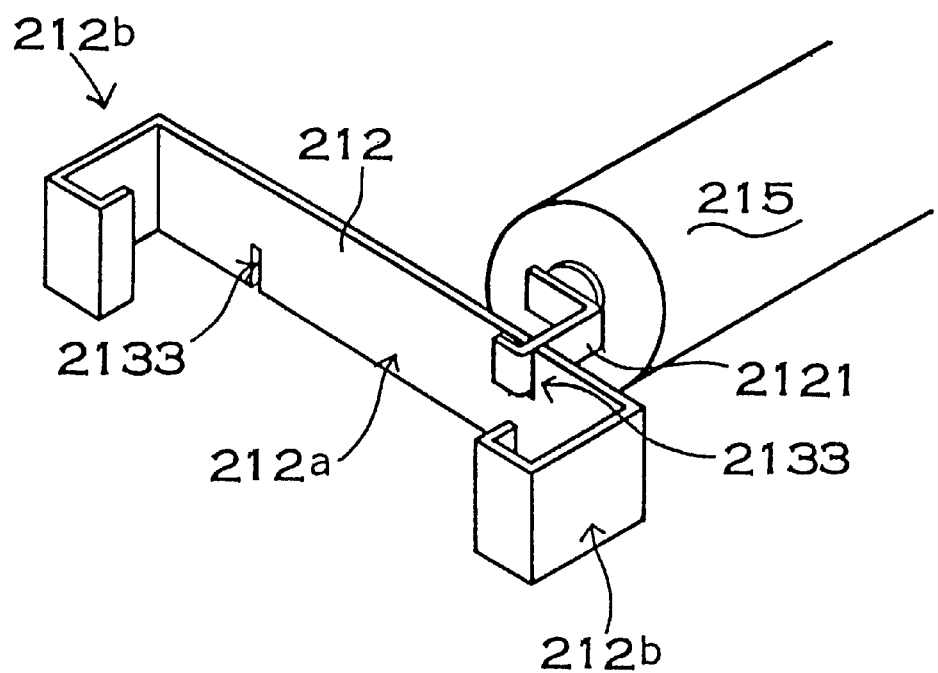
FIG. 21 is a perspective view showing the solder region of the parallel charge-discharge terminal piece and lead contained in the battery pack of another embodiment of the present invention.

The parallel charge-discharge terminal piece 152 connects to the positive terminal of the rechargeable batteries 155 via lead 1521. The lead 1521 can be soldered to the main body section 152*a* of the parallel charge-discharge terminal piece 152 as shown in FIGS. 3, 9, and 15. However, as shown in FIG. 21, a connecting slit 2133 can be provided laterally in the main body section 212*a* of the parallel charge-discharge terminal piece 212, and the lead 2121, electrically connected to battery 215, can be inserted in connecting slit 2133 and soldered for a more reliable connection. Parallel charge-discharge terminal piece 212 also is formed with bent sections 212b.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A battery pack which can be attached to an electrical apparatus independent of orientation, said battery pack comprising:

rechargeable batteries;

a casing containing said rechargeable batteries and including a first case section, and a second case section secured to said first case section;

a first charge-discharge terminal piece engaged in attachment sections at a front end portion of said casing such that said first charge-discharge terminal piece is secured in position at the front end portion of the casing, said first charge-discharge terminal piece being formed of sheet metal which is bent into a C-shape having two bent sections and a main body section interconnecting said two bent sections, wherein said main body section is substantially parallel to an end wall of said casing;

a second charge-discharge terminal piece attached to at least one of said first and second casing sections, said second charge-discharge terminal piece being formed of sheet metal bent into a C-shape having two bent sections and a main body section interconnecting said bent sections, wherein said main body section of said second charge-discharge terminal piece is perpendicular relative to said main body section of said first charge-discharge terminal piece, and open sides of said C-shaped terminal pieces face in opposite directions.

2. A battery pack as claimed in claim 1, further comprising a projection formed integrally with said first case section, wherein one of said bent sections of said second charge-discharge terminal piece is provided with a through hole, and said projection is inserted into said through hole.

3. A battery pack as claimed in claim 2, wherein an end of said projection extending through said through hole is flattened to attach the second charge-discharge terminal piece to said case.

4. A battery pack as claimed in claim 1, further comprising fastening projections formed integrally on interior surfaces of said first and second case sections, respectively, wherein said bent sections of said second charge-discharge terminal piece have fastening holes and said fastening projections are engaged with said fastening holes to attach the second charge-discharge terminal piece to opposite sides of the case and to hold the first and second case sections together.

5. A battery pack as claimed in claim 1, further comprising a rib formed integrally with one of said first and second case sections, wherein one of said bent sections of said second charge-discharge terminal piece is provided with a slit, and said rib is inserted into said slit in order to retain the second charge-discharge terminal piece in a specified position within said case.

6. A battery pack as claimed in claim 1, wherein said main body section of said second charge discharge terminal piece is provided with a punched-out projection, and one of said first and second case sections is formed with a locking detent which mates with said punched-out projection.

7. A battery pack as claimed in claim 1, further comprising a C-shaped reinforcement rib formed integrally with one of said first and second case sections, wherein said C-shaped reinforcement rib is disposed between said rechargeable batteries and said charge-discharge terminal pieces in order to prevent the rechargeable batteries from contacting said charge-discharge terminal pieces.

8. A battery pack as claimed in claim 1, wherein a lateral slit is provided in one of said charge-discharge terminal pieces, and a lead is inserted into said lateral slit and soldered.

9. A battery pack as claimed in claim 1, further comprising a cap provided on a rear end portion of said casing which is opposite relative to the front end portion of said casing at which said first and second charge-discharge terminal pieces are disposed.

10. A battery pack as claimed in claim 9, wherein said cap is provided with a roughened outer surface.

11. A battery pack as claimed in claim 1, wherein said attachment sections comprise alignment ribs formed integrally at corners of the front end portion of said casing, wherein said alignment ribs retain said first charge-discharge terminal piece in a fixed position.

12. A battery pack as claimed in claim 1, further comprising open electrode windows formed in said case, wherein said bent sections of said first charge-discharge terminal piece are positioned outwardly of said alignment ribs so as to be exposed to the exterior of said case through said electrode windows.

13. A battery pack as claimed in claim 1, further comprising a reinforcement rib projection from an inside surface of one of said first and second case sections, wherein said reinforcement rib is located between the rechargeable batteries and said charge-discharge terminal pieces.

14. A battery pack as claimed in claim 1, wherein said first charge-discharge terminal piece is electrically connected to a positive terminal of the rechargeable batteries, and said second charge-discharge terminal piece is electrically connected to a negative terminal of the rechargeable batteries.

15. A battery pack as claimed in claim 1, further comprising open electrode windows formed in said case, wherein said bent sections of said second charge-discharge terminal piece are positioned in said electrode windows so as to be exposed exteriorly of said case.

16. A battery pack as claimed in claim 15, wherein said electrode windows are disposed on opposite sides of said case.

* * * * *